(12) United States Patent
Liu et al.

(10) Patent No.: US 7,773,579 B1
(45) Date of Patent: Aug. 10, 2010

(54) MULTIPLE USER TELEPHONE ROUTER

(75) Inventors: Calvin Y. Liu, Irvine, CA (US); Donald T. Mah, Trabuco Canyon, CA (US)

(73) Assignee: Cisco Technology, Inc., San Jose, CA (US)

( * ) Notice: Subject to any disclaimer, the term of this patent is extended or adjusted under 35 U.S.C. 154(b) by 1371 days.

(21) Appl. No.: 10/867,080

(22) Filed: Jun. 14, 2004

(51) Int. Cl.
*H04L 12/66* (2006.01)
(52) U.S. Cl. .................. 370/352; 370/401; 379/114.02
(58) Field of Classification Search ................. 370/401, 370/338, 352, 400; 379/114.02
See application file for complete search history.

(56) References Cited

U.S. PATENT DOCUMENTS

| | | | | |
|---|---|---|---|---|
| 5,930,247 | A * | 7/1999 | Miller et al. ................. | 370/338 |
| 6,442,264 | B1 | 8/2002 | Sutter | |
| 6,954,454 | B1 * | 10/2005 | Schuster et al. ............. | 370/352 |
| 7,075,918 | B1 * | 7/2006 | Kung et al. .................. | 370/352 |
| 7,301,940 | B1 * | 11/2007 | Bernstein ..................... | 370/356 |
| 2003/0059038 | A1 * | 3/2003 | Meyerson et al. ...... | 379/428.04 |
| 2004/0001579 | A1 * | 1/2004 | Feinberg et al. ............. | 379/156 |
| 2005/0041642 | A1 * | 2/2005 | Robinson ..................... | 370/352 |
| 2005/0068925 | A1 * | 3/2005 | Palm et al. ................... | 370/338 |
| 2005/0078690 | A1 * | 4/2005 | DeLangis ................... | 370/401 |
| 2005/0129069 | A1 * | 6/2005 | Binder ........................ | 370/493 |
| 2005/0210129 | A1 * | 9/2005 | Feng et al. .................. | 709/224 |
| 2007/0147315 | A1 * | 6/2007 | Khoury et al. .............. | 370/338 |

\* cited by examiner

*Primary Examiner*—Fan Tsang
*Assistant Examiner*—Simon King
(74) *Attorney, Agent, or Firm*—Haynes and Boone, LLP (57) ABSTRACT

Systems and methods are disclosed herein to provide telephone communication systems. For example, in accordance with an embodiment of the present invention, a communication system is disclosed having a router capable of supporting multiple telephone handsets and providing their corresponding voice communications over one or more network connections. The router may further support other devices, such as computers, printers, copiers, scanners, and other network-capable devices.

29 Claims, 4 Drawing Sheets

MULTIPLE USER TELEPHONE ROUTER

TECHNICAL FIELD

The present invention relates generally to communication systems and, more particularly, to telephone and computer systems.

BACKGROUND

Telephone systems that generally provide two-way voice communications are well known and form a central part of modern telecommunications. However, a conventional telephone system may have a number of limitations.

For example, a typical telephone line in a home or business environment is capable of communicating only one distinct voice communication (or telephone call) at a time. Therefore, to initiate another separate voice communication by a user operating a telephone connected to the telephone line, the current voice communication must end prior to initiating the next desired voice communication to a different destination.

Another limitation is that a conventional telephone system is generally isolated from other communication devices (e.g., a computer system or network) that may be found in a home or business environment. Consequently, the telephone system may offer limited flexibility or functionality. Furthermore, the telephone system represents an additional separate cost that is incurred in addition to any costs associated with other communication systems (e.g., a computer network or network connection, such as the Internet) that are located in the home or office with the telephone. As a result, there is a need for improved communication techniques related to the telephone and/or other communication mediums.

SUMMARY

Systems and methods are disclosed herein to provide improved communication systems, including telecommunications. For example, in accordance with an embodiment of the present invention, a communication system is disclosed having a router capable of supporting multiple telephone handsets and providing their corresponding voice communications over a network connection. The router may further support other devices, such as computers, printers, copiers, scanners, and other network-capable devices. The router may also selectively provide the voice communication over a network connection or a dedicated telephone network connection.

More specifically, in accordance with one embodiment of the present invention, a communication system includes a plurality of telephones adapted to provide voice communications; and a router adapted to communicate with the plurality of telephones and selectively provide their corresponding voice communications over a network connection or a telephone network connection depending upon a cost associated with providing the voice communication over the telephone network connection.

In accordance with another embodiment of the present invention, a telecommunications device includes a router having a network interface and adapted to support a plurality of telephones having corresponding voice communications, the router providing the voice communications simultaneously through the network interface and answering an incoming telephone call via the network interface and routing the incoming telephone call to an appropriate one of the plurality of telephones, and wherein the router comprises a processor adapted to support a dynamic Internet Protocol address service, a dynamic domain name system service, and/or a network to telephone network service.

In accordance with another embodiment of the present invention, a method of providing voice communications via a router includes receiving voice communications directly from one or more telephones, wherein the voice communications from the one or more telephones may be occurring simultaneously; routing the voice communications to a network and/or to a telephone network depending upon a cost associated with providing the voice communication over the telephone network; receiving voice communications from the network and/or the telephone network; and routing the voice communications to the appropriate one or more telephones.

In accordance with another embodiment of the present invention, a communication device includes a plurality of telephones adapted to provide voice communications; means for communicating with the plurality of telephones; and means for selectively providing their corresponding voice communications over a network connection or a telephone network connection depending upon a cost associated with providing the voice communication over the telephone network connection.

In accordance with another embodiment of the present invention, a router includes means for receiving voice communications directly from one or more telephones, wherein the voice communications from the one or more telephones may be occurring simultaneously; means for routing the voice communications to a network and/or to a telephone network depending upon a cost associated with providing the voice communication over the telephone network; means for receiving voice communications from the network and/or the telephone network; and means for routing the voice communications to the appropriate one or more telephones.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
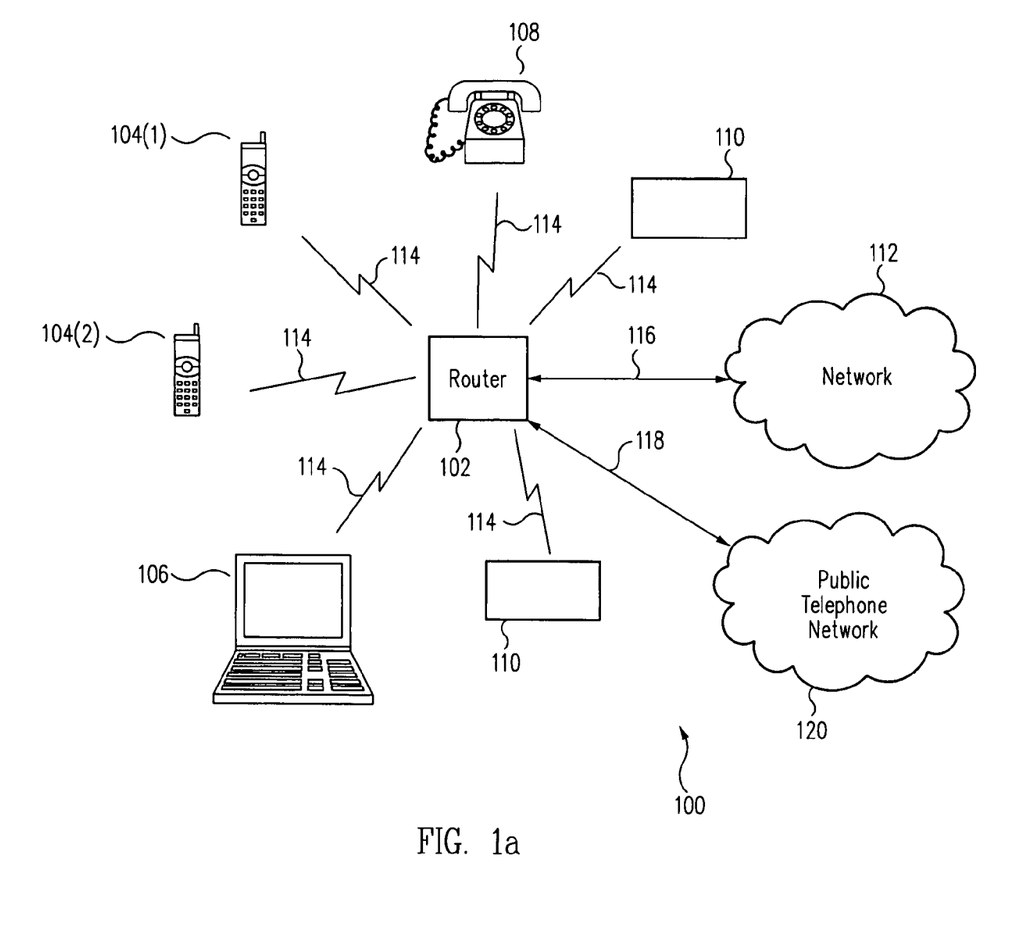
FIG. 1a shows a block diagram illustrating a communication system in accordance with an embodiment of the present invention.

FIG. 1a shows a block diagram illustrating a communication system 100 in accordance with an embodiment of the present invention. Communication system 100 includes a router 102 and one or more network telephones 104 and may also include one or more additional devices, such as a computer 106, a conventional telephone 108, and/or one or more additional devices 110.

Router 102 functions to route telephone calls (also referred to as voice communications) between (i.e., to/from) network telephones 104 and a network 112 via an interface 116 and may route a number of different telephone calls simultaneously between network 112 and corresponding network telephones 104. The number of network telephones 104 is not limited to two network telephones 104, as illustrated in FIG. 1a where two network telephones 104 are separately referenced as network telephones 104(1) and 104(2), but may include one, two, three, or more of network telephones 104 communicating through router 102. The number of telephone calls permitted at any given time may be limited based upon various factors, such as for example the amount of bandwidth available through interface 116 and network 112.

Network telephones 104 communicate with router 102 through an interface 114, which for example may be a wired interface (e.g., a network line such as an Ethernet line) or a wireless interface (e.g., an IEEE 802.11 interface or other Wi-Fi type of wireless communication system). Similarly, interface 116 may be a wired interface (e.g., a cable or a digital subscriber line (DSL)) or a wireless interface (e.g., a Wi-Fi, a cellular, or a satellite communication system) that provides access to network 112.

As an exemplary implementation, in accordance with an embodiment of the present invention, network 112 may represent the Internet, interface 116 may represent a DSL connection of an Internet service provider (ISP), and router 102 is located within a residence to route voice conversations for network telephones 104 over the Internet (e.g., provide voice over Internet Protocol (IP) or VoIP communications or other type of protocols, such as DSL or ATM). Network telephones 104 may represent IP broadband telephones.

As an example for this exemplary implementation, there may be three network telephones 104 (104(1), 104(2), and 104(3)) within the residence that utilize router 102 to communicate the voice conversations via the Internet. Each network telephone 104 may simultaneously initiate and continue a separate voice communication to a different corresponding destination, with router 102 appropriately routing the three different telephone calls. Alternatively, two or more of network telephones 104 may all join in on the same telephone call to a destination (i.e., a conference call or a party line), if desired by the users of network telephones 104. Furthermore, network telephones 104 may communicate with each other directly through router 102 (e.g., a user of network telephone 104(1) may communicate to a user of network telephone 104(2) via router 102). Alternatively, network telephones 104 may communicate with each other via router 102 and network 112 (e.g., through router 102 to network 112 and then back through router 102 to desired network telephone 104).

As a specific example, a first person may use network telephone 104(1) to place a telephone call to a first location, a second person may use network telephone 104(2) to place a telephone call to a second location, and a third person may use network telephone 104(3) to place a telephone call to a third location. Router 102 appropriately combines and routes all three of these telephone calls that may be occurring at the same time over interface 116 to network 112. Alternatively for example, the second person may use network telephone 104(2) and the third person may use network telephone 104(3) to join in on the telephone call made to the first location by the first person on network telephone 104(1). Thus, for example, in contrast to conventional telephone lines that allow only one telephone call to be made at a time, router 102 allows a residential network connection to support more than one telephone call to occur at a time, which provides greater functionality and flexibility.

The desired location or destination of a telephone call made by one or more of network telephones 104, in accordance with an embodiment of the present invention, may be to any of a number of devices. For example, referring briefly to FIG. 1b, a block diagram is shown for a communication system 150 in accordance with an embodiment of the present invention. Communication system 150 includes communication system 100 (FIG. 1a), which communicates through network 112 to a device 154 having an interface 152 to network 112.

Figure 1B:
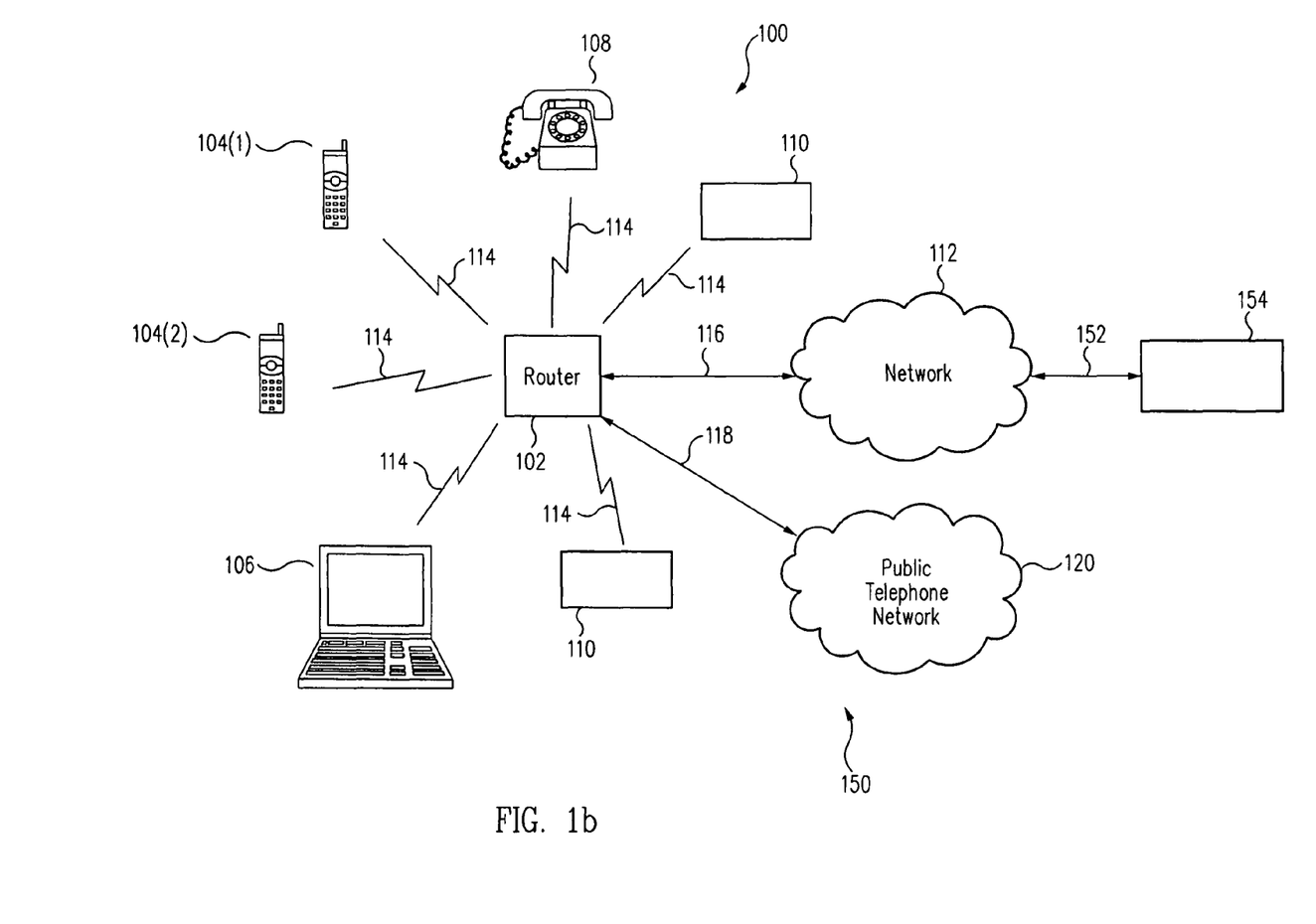
FIG. 1b shows a block diagram illustrating a communication system in accordance with an embodiment of the present invention.

Device 154 may represent another communication system 100 (e.g., one or more network telephones 104 communicating through router 102), with interface 152 being similar to that described for interface 116. Therefore, as an example, if router 102 within communication system 100 and router 102 within device 154 have static Internet Protocol (IP) addresses (with network 112 for this example representing the Internet), then routers 102 are capable of routing the telephone calls directly to each other. However, for this example, if the desired destination of the telephone call (e.g., router 102 of device 154) has a dynamic IP address, then for example a dynamic IP address service or a dynamic domain name system service can be utilized (as known by one skilled in the art) to locate and direct the telephone call information to the appropriate IP address of the desired destination (i.e., the dynamic IP address of router 102 of device 154).

Device 154 may also represent a computer, with one or more of network telephones 104 communicating to a user of the computer. The user may, for example, wear headphones equipped with a microphone to facilitate a voice communication. To enable voice communications by the user via the computer, the computer would run a software application which provides the voice information received via network 112 from network telephones 104 to the user's headphones and provides the sound received at the user's microphone to network telephones 104 via network 112 (as known by one skilled in the art). Similarly as described above, if the computer has a static IP address, router 102 may route the information directly to the computer, but if the computer has a dynamic IP address, a dynamic IP address service or a dynamic domain name system service can be utilized as described previously herein.

Device 154 may also represent a conventional telephone, with interface 152 representing a telephone service that converts and transfers voice communications carried on network 112 onto a conventional telephone system. As an example, if network 112 represents the Internet, interface 152 represents a communication service provider that appropriately routes voice communications between network 112 and the desired conventional telephone operating on the conventional telephone system (as known by one skilled in the art).

Returning to FIG. 1a, communication system 100 may also include one or more additional functions or support additional devices. For example, router 102 may route information (e.g., voice or data) between one or more of computers 106 and network 112. Router 102 may also route voice communications between one or more conventional telephones 108 and network 112, with interface 114 representing a wireless interface or a wired interface (e.g., a conventional telephone line).

Router 102 may also incorporate answering machine functionality to store voice messages for network telephones 104 and/or conventional telephones 108. The voice messages may be retrieved by network telephones 104 and/or conventional telephones 108 within communication system 100 or by another device (e.g., a computer, a network telephone, or a conventional telephone), which is outside of communication system 100 but that can access router 102 via network 112. Router 102 may also provide call forwarding, caller identification, personal answering message, voice mail, telephone lists and directories, and/or other types of voice communication services.

Router 102 may also support or route information for devices 110. For example, device 110 may represent a printer, a facsimile machine, a scanner, a copy machine, or other type of device that may be coupled to a router. Furthermore, network telephones 104, computers 106, conventional telephones 108, and/or devices 110 may communicate with one another within communication system 100 via router 102 (e.g., communication system 100 forms a local area network with router 102 controlling communication within the local area network).

Communication system 100 may also include an interface 118 (e.g., one or more conventional telephone lines) to a public telephone network 120 (e.g., a conventional public switched telephone network or telephone service provider). Router 102 may function to route telephone calls between conventional telephone 108 and/or network telephones 104 and public telephone network 120 via interface 118. In general, router 102 may route only one telephone call via interface 118 (i.e., per conventional telephone line) rather than a number of different telephone calls simultaneously via interface 116, as described herein. It should also be understood that there may be a number of interfaces 118 between router 102 and public telephone network 120. The one telephone call may include, for example a conference call involving more than one conventional telephone 108 and/or more than one network telephone 104. Furthermore, router 102 may determine whether to route a telephone call via interface 116 or interface 118 based on certain conditions, such as described in further detail herein (e.g., in reference to FIG. 4).

Figure 2:
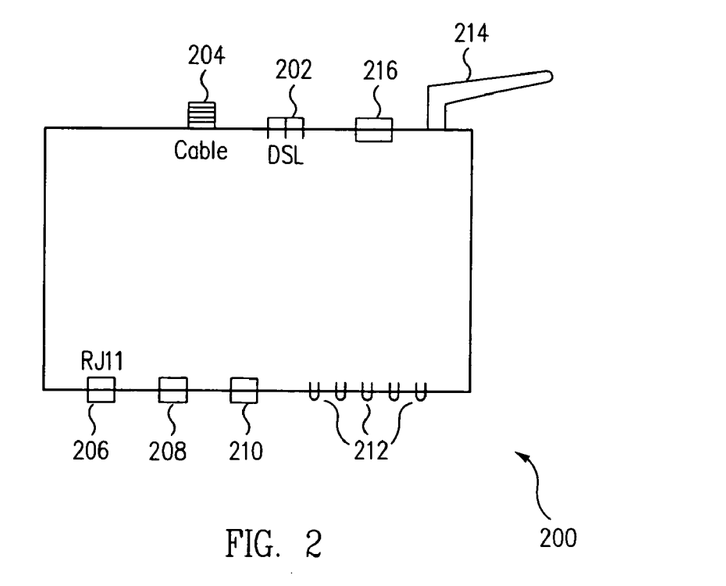
FIG. 2 shows a block diagram illustrating an exemplary implementation of a router in accordance with an embodiment of the present invention.

FIG. 2 shows a block diagram illustrating a router 200 in accordance with an embodiment of the present invention. Router 200 may be viewed as an exemplary implementation of router 102 of FIG. 1a. Router 200 may include a DSL terminal 202, a cable terminal 204, one or more conventional telephone jacks 206, one or more network jacks 208, one or more terminals 210, one or more indicator lights 212, one or more antennas 214, and/or one or more conventional telephone jacks 216, depending upon the desired application or requirements.

DSL terminal 202 provides a connection point for a DSL network gateway. For example, DSL terminal 202 may be the connection point for a DSL modem that provides a gateway to a network (e.g., a network 112 of FIG. 1a) or the DSL modem may be incorporated into router 200 and DSL terminal 202 provides a connection point for a telephone line providing DSL service and access to the network.

Similarly, cable terminal 204 provides a connection point for a cable gateway to the network. Cable terminal 204 may be a connection point for a cable modem or the cable modem may be incorporated into router 200, with cable terminal 204 providing a connection point for a cable line that provides access to the network (e.g., a network 112 of FIG. 1a).

Router 200 may include one or more conventional telephone jacks 206 (e.g., RJ11) to connect, for example, to a conventional telephone (e.g., conventional telephone 108 of FIG. 1a) or other device (e.g., device 110 of FIG. 1a, such as a facsimile machine or an answering machine). Router 200 may also include one or more network jacks 208 (e.g., RJ45) to connect, for example, to other network-capable devices (e.g., computers 106, network telephones 104, or to device 110 of FIG. 1a, such as a copy machine or a printer). Router 200 may also include one or more terminals 210 (e.g., a universal serial bus (USB) or other type of terminal), which may serve as a connection point for devices 110 (FIG. 1a) or other devices within communication system 100.

Router 200 may provide status and other information via one or more lights 212 (e.g., light emitting diodes (LEDs)), such as a power indication, network activity (e.g., wired and/or wireless), and telephone or other device activity. One or more antennas 214 may also be incorporated into router 200 to provide wireless connectivity to, for example as shown in FIG. 1a, network telephones 104, computers 106, conventional telephones 108, devices 110, and/or network 112 (via interface 116). One or more conventional telephone jacks 216 (or telephone line connections) may also be incorporated into router 200 for connecting router 200 to a public telephone network (e.g., as described in reference to FIG. 1a for interface 118).

Figure 3:
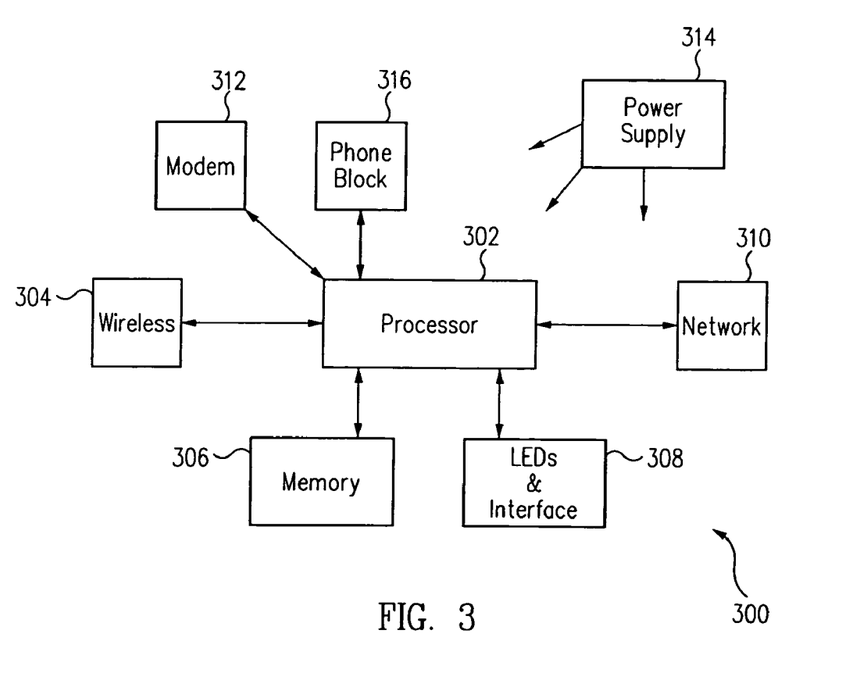
FIG. 3 shows an exemplary functional block diagram implementation of a router in accordance with an embodiment of the present invention.

FIG. 3 shows a functional block diagram of a router 300 in accordance with an embodiment of the present invention. Router 300 may be viewed as an exemplary functional implementation of router 102 (FIG. 1a) and/or router 200 (FIG. 2). Router 300 includes a processor 302, a wireless interface 304, a memory 306, an interface block 308, a network interface 310, a modem 312, a power supply 314, and a telephone block 316.

Processor 302 monitors various aspects or operations of router 300 and controls or executes various functions of router 300. Processor 302 may also incorporate and implement one or more functional block diagram aspects of router 300. For example, processor 302 may incorporate and implement modem 312, wireless interface 304, telephone block 316, and/or network interface 310. Processor 302 may also provide various other functions, such as for example to provide print server functionality for a printer connected to router 300 (e.g., where device 110 represents a network printer in FIG. 1a).

Processor 302 may also provide support or network functions, such as for example functions associated with running applications for a dynamic IP address service, a dynamic domain name system service, and/or a network (e.g., Internet) to conventional telephone network service, as discussed herein.

Wireless interface 304 controls the wireless interface between router 300 and, for example, network telephones 104. As an example, wireless interface 304 may operate to provide Wi-Fi connectivity (e.g., IEEE 802.11g standard) to network telephones 104. Memory 306 may represent static random access memory, flash memory, electrically erasable programmable read only memory, and/or other types of memory for router 300.

Interface block 308 provides status lights, a power switch, and/or a reset switch to assist a user to maintain proper operation of router 300 and provide relevant information to the user and appropriate connections to external devices. Network interface 310 controls the interface (e.g., wired or wireless) between router 300 and a network (e.g., network 112). Modem 312 provides modulation and demodulation for network interface 310, such as to provide DSL modem or cable modem functionality. Modem 312 may be incorporated into network interface 310 or processor 302.

Power supply 314 (e.g., a battery or a backup battery and/or an alternating current (AC) adapter) supplies the appropriate power levels to electrical components (e.g., processor 302 and memory 306) of router 300. Telephone block 316 may provide answering machine functionality and other telephone or voice services, such as call forwarding, voice mail, and/or telephone lists or directories.

As an exemplary implementation (referring to FIGS. 1*a* and 3), router 300 may represent a wireless-G voice cable gateway (or wireless-G router) which supports multiple voice communications or channels. Thus, for example, wireless interface 304 would support the IEEE 802.11g standard, modem 312 may be a cable modem that supports data over cable service interface specifications (DOCSIS 1.0, 1.1, and/or 2.0), and interface block 308 would support multiple Ethernet ports, multiple RJ11 voice ports, a cable terminal, and one or more antennas and indicator lights.

Processor 302, for example which may include network interface 310 and modem 312, may support media gateway control protocols (MGCP) or PacketCable 1.1 specifications. Processor 302 may also provide other support functions to interface with network telephones 104. For example, processor 302 may provide CODEC functions (e.g., G.729, G.723, and/or G.711), transmission control protocol/IP (TCP/IP) or dynamic host configuration protocol (DHCP) support, network address translation (NAT), dual-tone-multi-frequency (DTMF) tone detection and generation, facsimile pass-through capability (e.g., G.711 pass-through and/or G.711 facsimile mode), dynamic jitter buffer, line echo cancellation, and/or automated or manual configuration and control.

Similarly, network telephones 104 may support various functions to interface with router 300. For example, network telephones 104 may support VoIP protocols, such as for example session initiation protocol (SIP), MGCP, and/or H.323, provide CODEC functions (e.g., G.729, G.723, and/or G.711), and support TCP/IP and DHCP client functions. Network telephones 104 may also provide wireless transmission/reception, Wi-Fi protected access (WPA) wireless security support (e.g., Wi-Fi IP telephone), DTMF tone detection and generation, dynamic jitter buffer, line echo cancellation, automated or manual configuration and control, and/or support quality of service (QoS) protocols to ensure voice quality.

As disclosed herein in accordance with an embodiment of the present invention, router 102 (FIG. 1*a*) may have a connection to a network (e.g., network 112) and also a connection to a conventional telephone network (e.g., public telephone network 120). Router 102 may then determine whether to route a telephone call via the network or via the telephone network.

Figure 4:
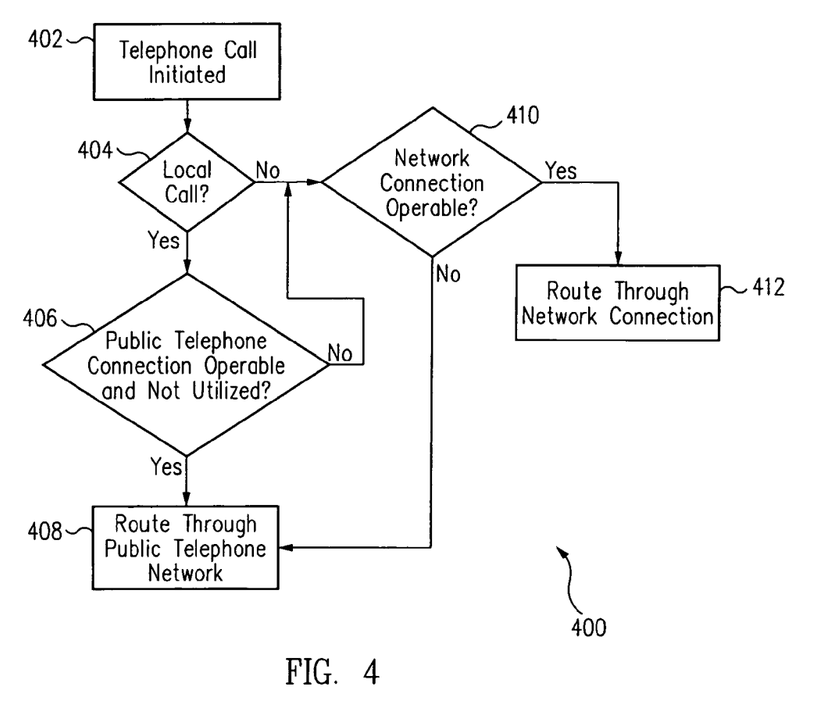
FIG. 4 shows an exemplary flowchart for determining a telephone network selection by a router in accordance with an embodiment of the present invention.

For example, FIG. 4 shows an exemplary flowchart 400 for determining a telephone call routing selection by a router (e.g., router 102 in communication system 100 of FIG. 1*a*) in accordance with an embodiment of the present invention. When a telephone call is initiated in operation 402 (e.g., by one of network telephones 104 or conventional telephones 108), router 102 may determine (operation 404) whether the telephone call is a local call (e.g., no area code dialed or determine the cost associated with making the telephone call via the conventional telephone network). If it is a local call (or the cost is not prohibitive) and if a conventional telephone network exists and is not utilized (operation 406), then router 102 may route the telephone call through the conventional telephone network (operation 408).

However, if the conventional telephone network does not exist or is in use with an existing telephone call (operation 406) or if the telephone call, for example, is a toll call or a long distance call (operation 404) or other cost determination, then router 102 may determine whether the network connection (e.g., network 112) is operable (operation 410). If the network connection is operable, then the telephone call may be routed through the network connection (operation 412) as discussed herein. If the network connection is not operable, then router 102 may attempt to route the telephone call through the conventional telephone network. If the conventional telephone network is not available and the network is not available, router 102 may provide a busy signal to the telephone attempting to make the call and, if desired, continue to establish a connection via the network or the conventional telephone network.

Figure 5:
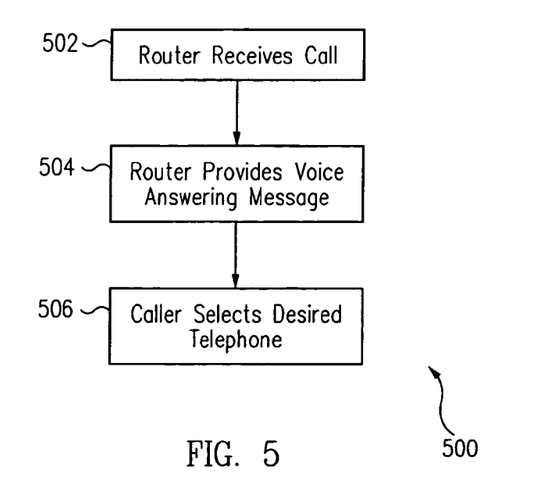
FIG. 5 shows an exemplary flowchart for managing an incoming call by a router in accordance with an embodiment of the present invention.

As also disclosed herein in accordance with an embodiment of the present invention, a router (e.g., router 102 of FIG. 1*a*) may receive calls from network 112 and/or public telephone network 120 (FIG. 1*a*) and route the call to the appropriate telephone associated with the router. For example, FIG. 5 shows an exemplary flowchart 500 for managing an incoming call by a router in accordance with an embodiment of the present invention. The router first receives the telephone call (operation 502) via network 112 or public telephone network 120. When the router receives the telephone call, the router, for example, may provide a voice answering message or automated voice attendant (operation 504) to answer the call and request that the caller select which person (or internal router phone number or mailbox) the caller is trying to reach. Each selection (e.g., for a person, an internal phone number, or a mailbox), for example, may be associated with a corresponding telephone supported by the router. When the caller makes a selection (operation 506), the router would then route the call to the selected telephone (e.g., one of network telephones 104 or conventional telephones 108).

In accordance with one or more embodiments of the present invention, a communication system is disclosed having a router capable of supporting multiple telephone handsets and providing their corresponding voice communications over a single network connection or selectively over more than one telephone call-capable connection. The router may further support other devices, such as computers, printers, copiers, scanners, and other network-capable devices.

Embodiments described above illustrate but do not limit the invention. It should also be understood that numerous modifications and variations are possible in accordance with the principles of the present invention. Accordingly, the scope of the invention is defined only by the following claims.

We claim:

1. A communication system comprising:
   a plurality of telephones adapted to provide voice communications, wherein the plurality of telephones include at least a network telephone that is configured to communicate over an Internet-Protocol based network and a conventional telephone that is configured to communicate over a public switched telephone network; and
   a router adapted to provide direct coupling and wireless coupling to the plurality of telephones and to select at least one of the direct coupling and the wireless coupling to communicate with the plurality of telephones, wherein the router selectively provides voice communications from the network telephone and voice communications from the conventional telephone over an Internet-Protocol based network connection or a public switched telephone network connection;
   wherein the router selectively provides the voice communications from the network telephone over the Internet-Protocol based network connection or the public switched telephone network connection depending upon availability and a cost associated with providing the voice communications from the network telephone over the public switched telephone network connection, and wherein the router selectively provides the voice communications from the conventional telephone over the Internet-Protocol based network connection or the public switched telephone network connection depending upon availability and a cost associated with providing the voice communications from the conventional telephone over the public switched telephone network connection.

2. The communication system of claim 1, wherein the plurality of telephones comprise network telephones adapted to communicate with the router through a wireless interface providing Wi-Fi connectivity.

3. The communication system of claim 1, wherein the router communicates with the plurality of telephones and provides direct coupling via a wired interface and wireless coupling via a wireless interface.

4. The communication system of claim 1, further comprising at least one network-capable device, wherein the router is adapted to communicate with the one or more devices and provide their information over the Internet-Protocol based network connection along with the voice communications and/or provide their information between one or more of the devices.

5. The communication system of claim 4, wherein the one or more devices comprise a computer, a printer, a facsimile machine, a scanner, and/or a copy machine.

6. The communication system of claim 1, wherein the Internet-Protocol based network connection is a wired or a wireless interface which couples the router to the Internet.

7. The communication system of claim 6, wherein the router provides the voice communications over the Internet-Protocol based network connection utilizing voice over Internet Protocol specifications.

8. The communication system of claim 1, wherein the router comprises a processor adapted to support gateway protocol functions, CODEC functions, dynamic host configuration protocol, network address translation, and/or dual-tone-multi-frequency tone detection and generation.

9. The communication system of claim 1, wherein the router is further adapted to provide print server and/or telephone answering machine capability.

10. The communication system of claim 9, wherein the router is adapted to answer an incoming telephone call via the Internet-Protocol based network connection or the public switched telephone network connection and route the telephone call to an appropriate one of the plurality of telephones.

11. The communication system of claim 1, wherein the router comprises a processor adapted to support a dynamic Internet Protocol address service, a dynamic domain name system service, and/or a network to telephone network service.

12. A telecommunications device comprising:
a router having an Internet-Protocol based network interface and adapted to provide direct coupling and wireless coupling and to select at least one of the direct coupling and the wireless coupling to support a plurality of telephones having corresponding voice communications, wherein the plurality of telephones include at least a network telephone that is configured to communicate over an Internet-Protocol based network and a conventional telephone that is configured to communicate over a public switched telephone network;
wherein the router is adapted to provide all of the voice communications simultaneously through the Internet-Protocol based network interface and answer an incoming telephone call via the Internet-Protocol based network interface and route the incoming telephone call to an appropriate one of the plurality of telephones, and wherein the router comprises a processor adapted to support a dynamic Internet Protocol address service, a dynamic domain name system service, and/or a network to telephone network service;
wherein the router further comprises a public switched telephone network interface, the router adapted to selectively provide the voice communications through the Internet-Protocol based network interface or the public switched telephone network interface; and
wherein the router selectively provides each of the voice communications from the network telephone and from the conventional telephone through the Internet-Protocol based network interface or the public switched telephone network interface depending upon availability and a cost associated with providing each of the corresponding voice communications over the public switched telephone network interface.

13. The device of claim 12, wherein the Internet-Protocol based network interface couples the router to the Internet, and the voice communications follow voice over Internet Protocol specifications.

14. The device of claim 13, wherein the network telephone is adapted to communicate directly with the router via a wireless interface providing Wi-Fi connectivity and the conventional telephone is adapted to communicate directly with the router via a wireless or a wired interface.

15. The device of claim 12, wherein the router comprises an antenna, an RJ11 port, a network port, and a cable and/or a digital subscriber line port.

16. The device of claim 12, wherein the router is further adapted to function as a print server and/or an answering machine, wherein stored telephone messages are retrievable from the router via the Internet-Protocol based network interface.

17. The device of claim 12, wherein the router is further adapted to support a computer and at least one other network-capable device.

18. The device of claim 12, wherein the router routes the incoming telephone call based on a user's selection, who initiated the incoming telephone call, of choices provided by the router.

19. A method of providing voice communications via a router, the method comprising:
receiving voice communications via a direct coupling and a wireless coupling from two or more telephones and selecting at least one of the direct coupling and the wireless coupling to support the telephones, wherein the telephones include at least a network telephone that is configured to communicate over an Internet-Protocol based network and a conventional telephone that is configured to communicate over a public switched telephone network, and wherein the voice communications from the corresponding telephones are occurring simultaneously;
routing each of the corresponding voice communications to an Internet-Protocol based network or to a public switched telephone network depending upon a cost associated with providing the corresponding voice communication over the public switched telephone network and whether the public switched telephone network is available for use;

receiving associated voice communications from the Internet-Protocol based network or the public switched telephone network; and routing the associated voice communications from the Internet-Protocol based network or the public switched telephone network appropriately to one or more of the telephones.

20. The method of claim 19, wherein the receiving of the voice communications from the telephones is via a wired interface for the direct coupling and a wireless interface for the wireless coupling.

21. The method of claim 19, wherein the routing each of the corresponding voice communications to the Internet-Protocol based network is adapted to provide multiple simultaneous telephone calls.

22. The method of claim 19, further comprising answering an incoming call and, based on a selection of the incoming call, routing a voice communications associated with the incoming call to the appropriate one or more telephones.

23. The method of claim 19, wherein the routing each of the corresponding voice communications to the Internet-Protocol based network or to the public switched telephone network is based on whether the voice communication is for a local call.

24. The method of claim 19, wherein the routing each of the corresponding voice communications to the Internet-Protocol based network or to the public switched telephone network is based on whether the Internet-Protocol based network or the public switched telephone network is operable.

25. A communication device system comprising:

a plurality of telephones adapted to provide voice communications, wherein the plurality of telephones include at least a network telephone that is configured to communicate over an Internet-Protocol based network and a conventional telephone that is configured to communicate over a public switched telephone network;

means for communicating to provide direct coupling and wireless coupling to the plurality of telephones and to select at least one of the direct coupling and the wireless coupling; and means for selectively providing the voice communications from the network telephone over an Internet-Protocol based network connection or a public switched telephone network connection depending upon availability and a cost associated with providing the voice communications from the network telephone over the public switched telephone network connection, with the providing means further selectively providing the voice communications from the conventional telephone over the Internet-Protocol based network connection or the public switched telephone network connection depending upon availability and a cost associated with providing the voice communications from the conventional telephone over the public switched telephone network connection.

26. The communication device system of claim 25, further comprising means for providing print server and/or telephone answering machine capability.

27. The communication device system of claim 25, further comprising means for answering an incoming telephone call via the Internet-Protocol based network connection or the public switched telephone network connection and routing the telephone call to an appropriate one of the plurality of telephones.

28. The communication device system of claim 25, further comprising means for supporting a dynamic Internet Protocol address service, a dynamic domain name system service, and/or a network to telephone network service.

29. A router comprising:

means for receiving voice communications via a direct coupling and a wireless coupling from two or more telephones to select at least one of the direct coupling and the wireless coupling to support the telephones, wherein the telephones include at least a network telephone that is configured to communicate over an Internet-Protocol based network and a conventional telephone that is configured to communicate over a public switched telephone network and wherein the voice communications from the telephones are occurring simultaneously;

means for routing each of the voice communications to an Internet-Protocol based network or to a public switched telephone network depending upon availability and a cost associated with providing each of the voice communications from the network telephone and from the conventional telephone over the telephone network;

means for receiving associated voice communications from the Internet-Protocol based network or the public switched telephone network; and means for routing the associated voice communications appropriately to one or more of the telephones.

* * * * *